(12) United States Patent
Joehren

(10) Patent No.: US 9,843,198 B2
(45) Date of Patent: Dec. 12, 2017

(54) VOLTAGE CONTROL USING RECTIFYING CIRCUITRY

(71) Applicant: NXP B.V., Eindhoven (NL)

(72) Inventor: Michael Joehren, San Jose, CA (US)

(73) Assignee: NXP B.V., Eindhoven (NL)

( * ) Notice: Subject to any disclaimer, the term of this patent is extended or adjusted under 35 U.S.C. 154(b) by 391 days.

(21) Appl. No.: 14/668,700

(22) Filed: Mar. 25, 2015

(65) Prior Publication Data

US 2016/0285277 A1 Sep. 29, 2016

(51) Int. Cl.
| | |
|---|---|
| *H02J 17/00* | (2006.01) |
| *H02J 5/00* | (2016.01) |
| *H02M 7/23* | (2006.01) |
| *H02M 1/00* | (2006.01) |
| *H02J 50/10* | (2016.01) |

(52) U.S. Cl.
CPC .............. *H02J 5/005* (2013.01); *H02J 17/00* (2013.01); *H02M 7/23* (2013.01); *H02J 50/10* (2016.02); *H02M 2001/008* (2013.01)

(58) Field of Classification Search
None
See application file for complete search history.

(56) References Cited

U.S. PATENT DOCUMENTS

| 8,730,697 B2 | 5/2014 | Kim et al. |
| 2006/0038658 A1 | 2/2006 | Jarvis et al. |
| 2009/0195074 A1* | 8/2009 | Buiel ............... H02J 3/28 307/48 |
| 2012/0155134 A1 | 6/2012 | Kim et al. |
| 2016/0099609 A1* | 4/2016 | Leabman ............ H02J 50/40 307/104 |

FOREIGN PATENT DOCUMENTS

CA 2027292 C 7/1995

OTHER PUBLICATIONS

Extended European Search Report for Patent Appln. No. 16158022.0 (dated Jul. 26, 2016).

* cited by examiner

*Primary Examiner* — Long Nguyen

(57) ABSTRACT

Aspects of the present disclosure are directed to methods, apparatuses and systems involving voltage control using rectifying circuitry. According to an example embodiment, an apparatus includes an antenna, a capacitor, and voltage control circuitry. The voltage control circuitry includes a first rectifying circuit to rectify a wireless signal and provide the rectified signal to an output load, a second rectifying circuit to rectify the wireless signal and provide the rectified signal to the capacitor, and a control logic circuit to regulate an output voltage provided to the output load relative to a threshold value. For each rectifying cycle, the control logic circuit determines whether the output voltage is above the threshold value, enables, in response to determining that the output voltage is below the threshold value, the first rectifying circuit, and enables, in response to determining that the output voltage is above the threshold value, the second rectifying circuit.

20 Claims, 4 Drawing Sheets

VOLTAGE CONTROL USING RECTIFYING CIRCUITRY

Aspects of various embodiments are directed to integrated circuit apparatuses and more particularly to apparatuses and methods for voltage control using rectifying circuitry.

Many apparatuses can be wirelessly powered. Wirelessly powering an apparatus can refer to power transferred from a wireless power transmitter to a wirelessly powered apparatus (e.g., wireless power receiver), such as using inductive or magnetic coupling. For example, a first apparatus (e.g., a wireless power transmitter) can transmit a wireless signal to a second apparatus (e.g., a wirelessly powered apparatus). The second apparatus receives the wireless signal using an antenna. The wireless signal can provide power to a load of the second apparatus.

In various instances, a wirelessly powered apparatus can use a rectifying circuit to convert the wireless signals from an alternating current (AC) signal to a direct circuit (DC) signal. An AC signal can periodically reverse polarity, whereas a DC signal can flow in one direction. Integrated circuit (IC) apparatuses can allow for flow in one direction. The output voltage and current from the rectifying circuit to the load can vary due to the variations of the attached load and/or the incoming magnetic field. In many instances, regulating the voltage output to the load by the rectifying circuit and creating a constant supply of voltage can be beneficial.

These and other matters have presented challenges to efficiencies of wirelessly powered apparatus implementations, for a variety of applications.

Various example embodiments are directed to wirelessly powered apparatuses and their implementation. According to an example embodiment, an apparatus includes an antenna, a capacitor and voltage control circuitry. The voltage control circuitry includes a first rectifying circuit configured and arranged to rectify a wireless signal received by the antenna and to provide the rectified signal to an output load, a second rectifying circuit configured and arranged to rectify the wireless signal received by the antenna and to provide the rectified signal to the capacitor, and a control logic circuit configured and arranged to regulate an output voltage provided to the output load relative to a threshold voltage value. For each rectifying cycle, the control logic circuit is configured and arranged to determine whether the output voltage is above the threshold voltage value or below the threshold voltage value, enable, in response to determining that the output voltage is below the threshold voltage value, the first rectifying circuit to provide the rectified signal to the output load, and enable, in response to determining that the output voltage is above the threshold voltage value, the second rectifying circuit to provide the rectified signal to the capacitor.

According to another example embodiment, an apparatus include an antenna, a capacitor and voltage regulator circuitry. The voltage regulator circuitry includes a first rectifying circuit configured and arranged to rectify a wireless signal received by the antenna and to provide the rectified signal to an output load, a second rectifying circuit configured and arranged to rectify the wireless signal received by the antenna and to provide the rectified signal to the capacitor, and a control logic circuit configured and arranged to regulate an output voltage provided to the output load relative to a threshold voltage value. For each rectifying cycle associated with a half-wave of the wireless signal, the control logic circuit is configured and arranged to compare the output voltage to a threshold voltage value. In response to the voltage being below the threshold voltage value, the control logic circuit is configured and arranged to enabling one of a first path and a second path of the first rectifying circuit to provide the rectified signal to the output load, and, in response the voltage being above the threshold voltage value, enabling one of a third path and a fourth path of the second rectifying circuit to provide the rectified signal to the capacitor.

According to a further example embodiment, an apparatus includes an antenna configured and arranged to receive wireless signals, a capacitor configured and arranged to accumulate voltage, and voltage control circuitry. The voltage control circuitry includes a first rectifying circuit configured and arranged to rectify a wireless signal received by the antenna and to provide the rectified signal to an output load, a second rectifying circuit configured and arranged to rectify the wireless signal and to provide the rectified signal to the capacitor, and a control logic circuit configured and arranged to regulate an output voltage provided to the output load relative to a threshold voltage value. The first rectifying circuit includes a first rectifying path through a first transistor, and is configured and arranged to provide the rectified signal to the output load, and a second rectifying path through a second transistor, and is configured and arranged to provide the rectified signal to an output load. The second rectifying circuit includes a third rectifying path through a third transistor, and is configured and arranged to provide the rectified signal to the capacitor, and a fourth rectifying path through a fourth transistor, and is configured and arranged to provide the rectified signal to the capacitor. For each rectifying cycle associated with a half-wave of the wireless signal, the control logic circuit is configured and arranged to determine if the output voltage is below the threshold voltage value, enable, in response to the output voltage being below the threshold voltage value, one of the first and second rectifying paths to provide the rectified signal to the output load, and enable, in response to the output voltage being above the threshold voltage value, one of the third and fourth rectifying paths to provide the rectified signal to the capacitor.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
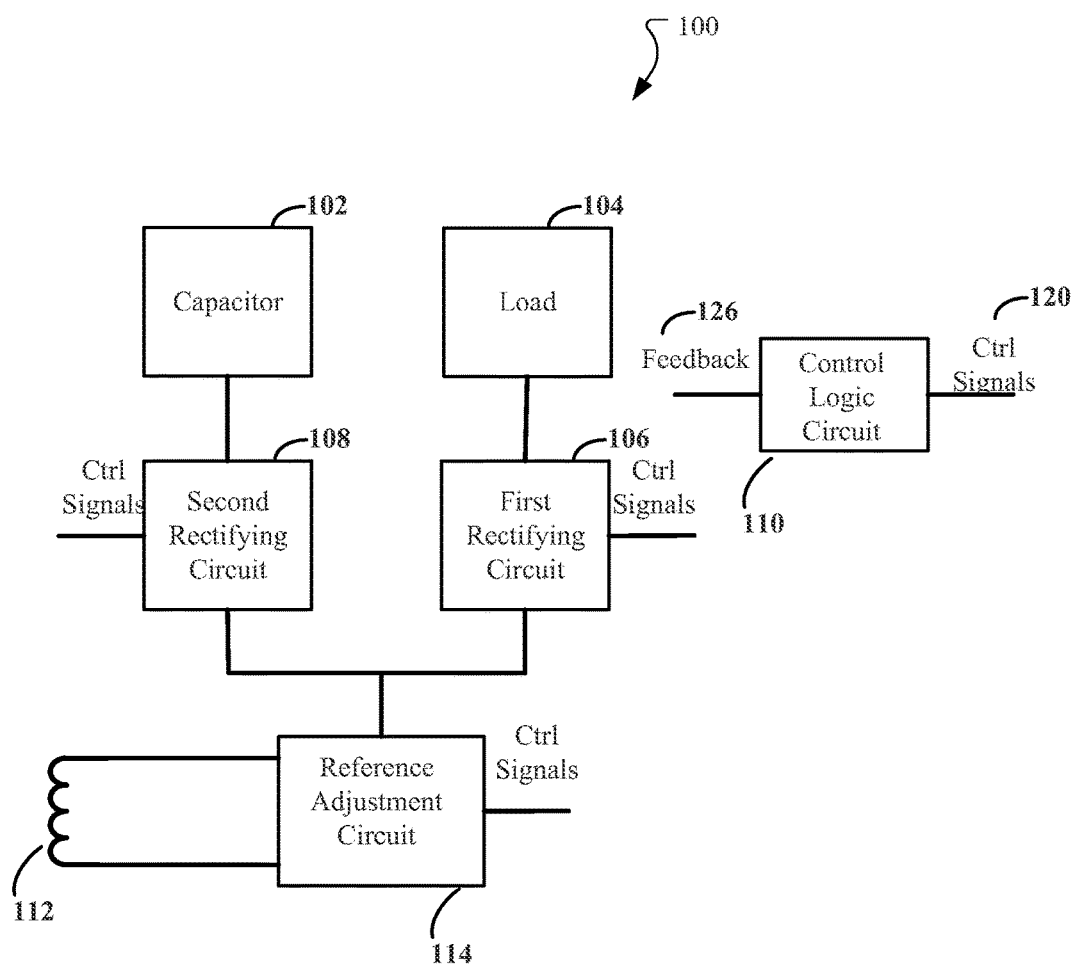
FIG. 1 shows a block diagram of an example wirelessly powered circuit according to various embodiments of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving a first (load) rectifying circuit, a second (alternate) rectifying circuit, and a control logic circuit to regulate an output voltage provided to an output load relative to a threshold value by enabling one of the first and second rectifying circuits to provide a rectified signal to one of an output load and a capacitor. In certain implementations, aspects of the present disclosure have been shown to be beneficial when used in the context of a system including a wireless power transmitter that can provide power to multiple wirelessly powered apparatuses. Using these approaches, the second rectifying circuit can be used to selectively provide power (e.g., voltage that is above a threshold voltage value). Providing power to the capacitor using the second rectifying circuit can adjust the effective impedance of the capacitor by changing its voltage. By adjusting the impedance of the capacitor, an impedance mismatch of the capacitor as compared to the load can be reduced as compared to static impedance of the capacitor, which can increase a power intake efficiency of the apparatus. Other aspects are directed to synchronous rectification with control of the output voltage. These and other aspects can be implemented to address challenges, including those discussed in the background above. While not necessarily so limited, various aspects may be appreciated through a discussion of examples using such exemplary contexts.

In accordance with a number of embodiments, the output of a rectifying circuit can be input to a capacitor to low-pass filter the DC signal (e.g., voltage) such that a ripple of the signal is reduced. Due to the variations of the attached load and/or the incoming magnetic field, the voltage output to the load can vary. To regulate the voltage output to the load by the rectifying circuit and create a constant supply of voltage, a Low Drop Out (LDO) regulator or a switching DC/DC converter can be used. Depending on the supply current and voltage difference of the output of the rectifying circuit and the LDO regulator or switching DC/DC converter, an efficiency of the wirelessly powered apparatus can be effected. With an LDO regulator, the efficiency of the wirelessly powered apparatus can increase with decreasing voltage drop across the LDO regulator. A switching DC/DC converter can allow for a greater difference between the voltage output from the switching DC/DC converter and the rectifying circuit as compared with the LDO regulator. For example, with a switching DC/DC converter, a peak efficiency of the wirelessly powered apparatus can be associated with a pre-defined (rectifying circuit) output and can degrade when the output voltage from the rectifying circuit deviates from the predefined output.

That is, both the LDO regulator and the switching DC/DC converter have efficiency limitations. An LDO regulator may work well in a low power application where the overall efficiency is not a high priority. For example, an LDO regulator may work well in inductive wireless power systems in which a wirelessly power apparatus controls the power transmitted (e.g., Wireless Power Consortium (WPC), Qi, and Power Matters Alliance (PMA)). However, an LDO regulator may not work well in a multi-apparatus configuration or resonance systems in which a transmitter powers multiple apparatuses and each of the multiple apparatuses may draw different amounts of power over time. In such implementations, the transmitter may not be able to control the individually distributed power level so that at least some of the multiple apparatus' voltage output by the rectifying circuit may be higher than the load uses. For example, the transmitter, in some embodiments, can adjust a power of the wireless signal based upon based on the power requirements of the wirelessly powered apparatus. However, if the transmitter is powering multiple wirelessly powered apparatuses, the requirements may different (e.g., based upon differences in the apparatuses and/or their respective distance to the transmitter). Accordingly, strength of the wireless signal may be less than ideal for one or more of the apparatuses. Thereby, one or more of the multiple wirelessly powered apparatuses may receive more power than desired.

In such multi-apparatus implementations/systems, a switching DC/DC converter may be used. However, an efficiency of a switching DC/DC converter can include around 93 percent efficiency over a load/source variation and the efficiency of a rectifying circuit can also around 93 percent efficiency. Thereby, using a switching DC/DC converter, the over efficiency of the wirelessly powered device can include around 86.5 percent efficiency (e.g., 0.93*0.93=0.8649).

According to various example embodiments, aspects of the present disclosure are directed to voltage control circuitry that can be used to synchronously rectify wireless signals and control an output voltage provided to an output load of an apparatus. The voltage control circuitry can include rectifying circuitry (e.g., a first and a second rectifying circuit) controlled by a control logic circuit. The control logic circuit can observe values of the regulated output voltage over time, and in response to a value of the regulated output voltage going over a threshold voltage value, can enable a path in the voltage control circuitry to provide power to the capacitor instead of the regulated output load. According to embodiments, providing the power to the capacitor results in a corresponding adjustment to the effective impedance of the capacitor that is responsive to power drawn by (and the effective impedance of) the load. This correlation between the effective impedances of the capacitor and the load can be particularly useful relative to the efficiency of the power regulation by the circuit.

According to particular embodiments, a load that is drawing high amounts of power provided from received wireless signals can result in the second rectifying circuit not being enabled and/or minimally being enabled. The reduced activation of the second rectifying circuit and can result in a low amount of power being stored on the capacitor associated with the second rectifying circuit. When the output voltage goes above the threshold voltage value and the second rectifying circuit is enabled, the effective impedance of capacitor (which has a low voltage/charged) is relatively low and draws more current/power, which is similar to the effective impedance of the load (which is drawing high power). By contrast, if the load is drawing low amounts of power, the second rectifying circuit can be enabled more frequently (as compared to the load drawing high amounts of power), which can result in a higher amount of charge being stored on the capacitor associated with the second rectifying circuit. When the voltage goes above the threshold value and the second rectifying circuit is enabled, the capacitor (which has a relatively high charge/voltage) may draw a lower amount of power. Thereby, an impedance of the outputs can be adjusted such that there is less impedance mismatch between the power transmitter and the power receiver (as compared to a static impedance solution). A reduced impedance mismatch can be useful for increasing an efficiency of the power intake and increase an efficiency of the apparatus as compared to a static impedance.

Turning now to the figures, FIG. 1 shows a block diagram of an example wirelessly power circuit of an apparatus, as may be implemented in accordance with one or more embodiments of the present disclosure. As illustrated by FIG. 1, various apparatus embodiments include an antenna 112, a capacitor 102, and a voltage control circuitry. The antenna 112 can receive wireless signals from another apparatus. The voltage control circuitry can, in various embodiments, synchronously rectify wireless signals received by the antenna 112 and control an output voltage provided to the output load 104. For example, the voltage control circuitry can be used to divert excess power (e.g., power not drawn by the output load 104) to a capacitor 102 for storage, as discussed further herein.

The voltage control circuitry can include a first rectifying circuit 106, a second rectifying circuit 108 and a control logic circuit 110. The first rectifying circuit 106 can rectify a wireless signal received by the antenna 112 and provide the rectified signal to the output load 104. The second rectifying circuit 108 can rectify the wireless signal received by the antenna 112 and provide the rectifying signal to the capacitor 102.

The control logic circuit 110 can regulate an output voltage provided to the output load 104 relative to a threshold voltage value. The threshold voltage value can include a predefined value, such as a reference voltage. In various embodiments, the control logic circuit 110 can be configured to regulate the output voltage by enabling and disabling the first rectifying circuit 106 in response to a feedback. The decision to enable/disable can be made, for example, per rectifying cycle. In various embodiments, the rectifying cycle can be synchronous with the input wireless signal. For example, for a cycle of a wave of the wireless signal, the wireless signal can be broken into two components: a positive component and a negative component. A first rectifying cycle can be associated with the positive component (e.g., a positive phase) and the second rectifying cycle can be associated with the negative component (e.g., a negative phase), and this can be repeated for the entire wave of the wireless signal.

For each rectifying cycle, the control logic circuit 110 can determine if the output voltage is below the threshold voltage value. The determination can include comparing the output voltage to the threshold voltage value. The control logic circuit 110 can determine the output voltage, in various embodiments, as feedback 126 from the first rectifying circuit 106. The feedback can include, for example, a value of voltage that is output from the first rectifying circuit 106. In response to the output voltage being below the threshold voltage value, the control logic circuit 110 can enable the first rectifying circuit 106 to provide the rectified signal to the output load 104. In response to the output voltage being above the threshold voltage value, the control logic circuit 110 can enable the second rectifying circuit 108 to provide the rectified signal to the capacitor 102. An output voltage that is above the threshold voltage value can indicate that the output load 104 is receiving more power than it may draw.

Consistent with embodiments, the threshold voltage value can also include a hysteresis component. For instance, the threshold voltage value can be shifted depending upon which rectifying circuit was activated in a previous cycle. This can be particularly useful for reducing unwanted oscillations between rectifying circuits. For ease of discussion, the threshold voltage value is discussed without specific reference to a hysteresis component, but the discussion is not meant to be limiting in this regard.

In various embodiments, each of the first rectifying circuit 106 and the second rectifying circuit 108 can include two paths. For example, the first rectifying circuit 106 can include a first (rectifying) path and a second (rectifying) path and the second rectifying circuit 108 can include a third (rectifying) path and a fourth (rectifying) path. The particular path that is enabled/used to rectify the signal and provide the rectified signal to one of the output load 104 and the capacitor 102 can depend on the phase of the wireless signal, as discussed further herein.

The determination by the control logic circuit 110 of whether the output voltage provided to the output load 104 is below a threshold voltage value can be made during a preceding rectifying cycle. For example, the control logic circuit 110 can determine if a value of the output voltage is below the threshold voltage value during a first rectifying cycle. In response to the output voltage being below the threshold voltage value during the first rectifying cycle, the control logic circuit 110 can enable the first rectifying circuit 106 to provide the rectified signal to the output load 104 during a second rectifying cycle. By contrast, in response to the output voltage being above the threshold voltage value during the first rectifying cycle, the control logic circuit 110 can enable the second rectifying circuit 108 to provide the rectified signal to the capacitor 102 during the second rectifying cycle.

The capacitor 102 can accumulate power over time from the provided rectified signals. In various embodiments, the capacitor 102 can be pre-charged to a threshold level. The threshold level can include a same level as the voltage at the output load, as further described in connection with FIG. 2.

In various embodiments, the voltage control circuitry can include a reference adjustment circuit 114. The reference adjustment circuit 114 can shift a reference point of the received wireless signal. For example, as further illustrated by FIG. 2, the reference adjustment circuit 114 can include a first transistor and a second transistor. The control logic circuit 110, in such embodiments, can selectively connect one of two nodes of the reference adjustment circuit 114 to ground based on a phase of the wireless signal to enable one of the first or a second transistors of the reference adjustment circuit 114 to shift the reference point, as discussed further herein. In this context, "reference" is another word for ground.

As further illustrated by FIG. 1, the control logic circuit 110 can receive sensing inputs from various components of the apparatus. For example, the control logic circuit 110 can provide control signals 120 to the first rectifying circuit 106, the second rectifying circuit 108, and/or the reference adjustment circuit 114, via control signal inputs. The control logic circuit 110 can receive feedback 126 back from one or more of the various components. For example, the feedback can include a voltage output from the first rectifying circuit 106. Using the control signals and feedback, the control logic circuit 110 can enable various paths of the first and second rectifying circuits 106, 108, paths of the reference adjustment circuit 114, and/or can control a output voltage provided to the output load 104 (e.g., based on feedback from the output of the first rectifying circuit 106). In various embodiments, the control logic circuit 110 provides the control signals and reads the feedback.

The circuit 100 illustrated by FIG. 1 and in accordance with various embodiments, can be used to synchronously rectify a wireless signal with control of an output voltage provided to an output load. Excess power can be provided to a capacitor 102 for storage. By providing the excess power to the capacitor 102 for storage, an impedance of the capacitor 102 can adjust. The adjusting impedance of the capacitor 102 can lower a mismatch impedance between the capacitor 102 and the output load 104 (e.g., an impedance of another capacitor associated with the output load 104) as compared to the impedance of the capacitor 102 being static. By avoiding and/or minimizing an impedance mismatch, a power intake efficiency of the apparatus can increase as compared to a mismatching impedance. The efficiency of the power intake can, for example, be dependent on the efficiency of the rectifying circuits (e.g., 93 percent efficiency). For example, in resonance based wireless power systems, an impedance mismatch between the transmitter and the receiver unit can reduce the power transferred.

For example, assuming a peak current delivered by the antenna 112 is 3 amps (A) and an on time of the transistors is 100 nanoseconds (ns) and using a capacitor associated with the output load 104 (e.g., the capacitor 236 CDC illustrated by FIG. 2) of 10 µF, a voltage increase on output voltage (e.g., DCreg illustrated by FIG. 2) can be calculated to be $\Delta U = I*T/C = 3*100*10-9/10*10-6 = 30$ mV. This can include a voltage step assuming no load is connected. The voltage step can be controlled by changing the decoupling capacitor (e.g., the capacitor 236 CDC) size. The same basic formula applies if power is diverted to the capacitor 102.

The various embodiments described herein may be combined in certain embodiments, and various aspects of individual embodiments may be implemented as separate embodiments. For instance, aspects of FIG. 1 can be the apparatus described in FIG. 2, can comply with the timing diagram of FIG. 3, and/or can be utilized to perform the process described in FIG. 4.

Figure 2:
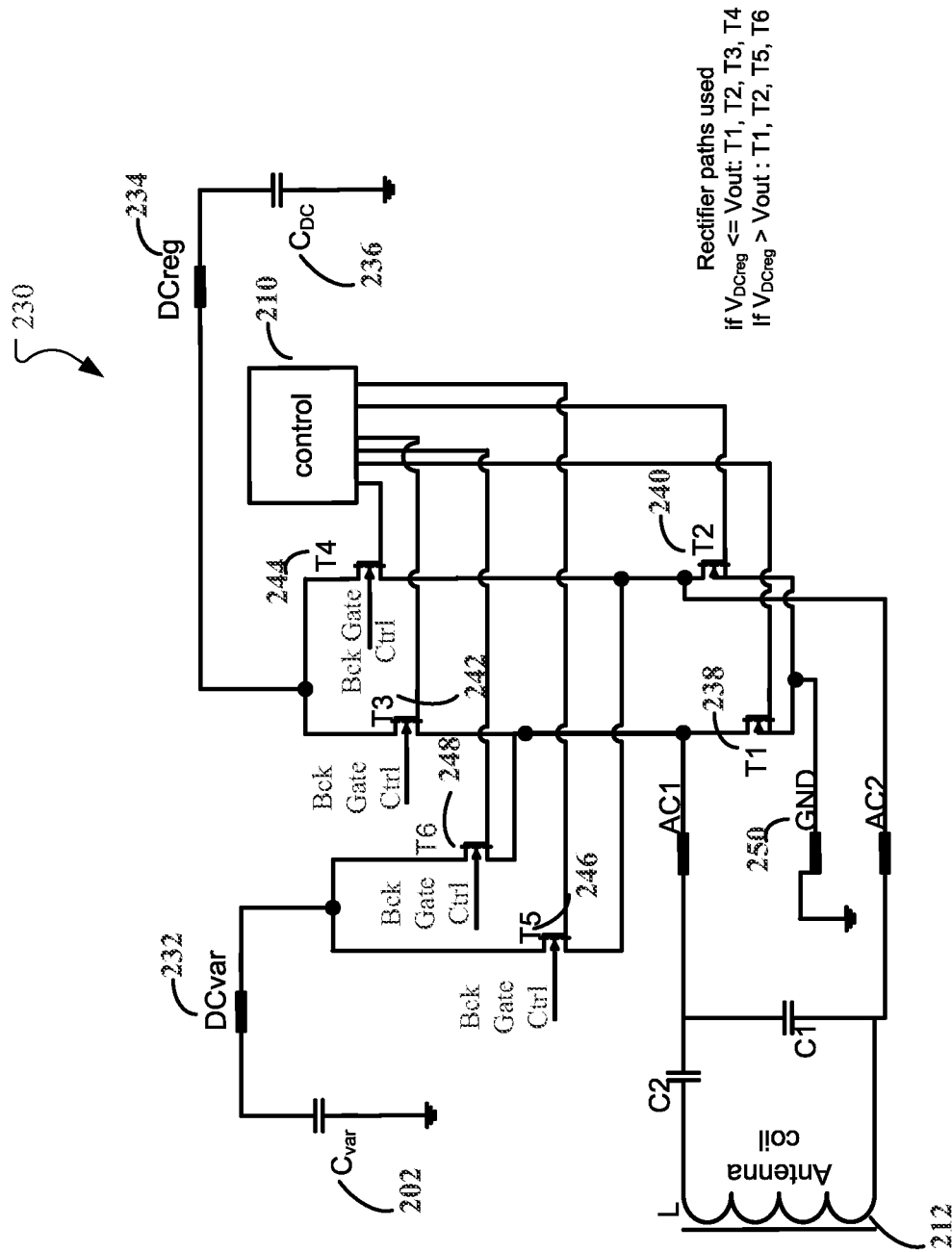
FIG. 2 shows a circuit diagram of a wirelessly powered circuit according to various embodiments of the present disclosure.

FIG. 2 shows a circuit diagram of a wirelessly powered circuit 230 of an apparatus according to various embodiments of the present disclosure. As illustrated by FIG. 2, example apparatus embodiments include an antenna 212 to receive wireless signals, a capacitor 202 to accumulate voltage, and voltage control circuitry. Similarly as discussed in FIG. 1, the voltage control circuitry can include a first rectifying circuit, a second rectifying circuit, and a control logic circuit 210.

The first rectifying circuit can rectify a wireless signal received by the antenna 212 and provide the rectified signal to an output load (e.g., not illustrated by FIG. 2). A capacitor 236 can be used to low-pass filter a voltage provided (e.g., output voltage 234) to the output load. However, if an output voltage provided to the output load is above a threshold voltage level (e.g., additional power is not needed for the output load), a second rectifying circuit can be used to rectify a wireless signal received by the antenna 212 and provide the rectified signal to the capacitor 202.

In various embodiments, the voltage control circuit can include a reference adjustment circuit, as discussed further herein. The reference adjustment circuit can include a first transistor T1 238 and a second transistor T2 240. The reference adjustment circuit can shift the reference point of the wireless signal by activating one of the transistors. For instance, the control logic circuit 210 can connect one of node AC1 and node AC2 (e.g., by enabling either the transistor 238 or the transistor 240) to ground 250 to provide a corresponding reference point for the AC signal. The control logic circuit 210 can connect one of the nodes AC1, AC2 each based upon the relative voltage of the signal. For example, the wireless signal can be referred to as positive when AC1>AC2 and negative when AC2<AC1. For example, node AC2 can be connected to ground 250 in response to the wireless signal being positive. Connecting the node AC2 to ground can enable the second transistor 240 of the reference adjustment circuit (e.g., T2).

As illustrated by FIG. 2, the first rectifying circuit can include two rectifying paths configured and arranged to provide the rectified signal to the output load. A first rectifying path can be through a first transistor 242 (e.g., T3) and a second rectifying path can be through a second transistor 244 (e.g., T4, such as T4 and T1). As further explained herein, the transistor T2 or T1 can be enabled based on a polarity of the wireless signal (e.g., thus enabling a path between T2 and T3 or T1 and T4).

The second rectifying circuit can include two rectifying paths configured and arranged to provide the rectified signal to the capacitor 202, which can include third and fourth rectifying paths of the apparatus. A third rectifying path can be through a third transistor 248 (e.g., T6) and a fourth rectifying path can be through a fourth transistor 246 (e.g., T5). Similarly, the transistor T2 or T1 can be enabled based on the polarity of the wireless signal (e.g., thus enabling a path between T2 and T6 or T1 and T5).

The control logic circuit 210 can regulate an output voltage (e.g., the output 234 of the first rectifying circuit) provided to the output load. The regulation can be relative to a threshold voltage value. For example, for each rectifying cycle, the control logic circuit 210 can determine if the output voltage is below the threshold value. The control logic circuit 210 can, for example, read a value of an output 234 of the first rectifying circuit to determine if the output voltage is below the threshold value.

In response to the output voltage being below the threshold voltage value, the control logic circuit 210 can enable (e.g., using control signals) one of the first and the second rectifying paths to provide the rectified signal to the output load. In response to the output voltage being above the threshold voltage value, the control logic circuit 210 can enable one of the third and the fourth rectifying paths to provide the rectified signal to the capacitor 202. Enabling a path and/or a particular rectifying circuit, as used herein, can include activating a particular transistor and/or closing a particular transistor to enable the transistor in the appropriate path.

Figure 3:
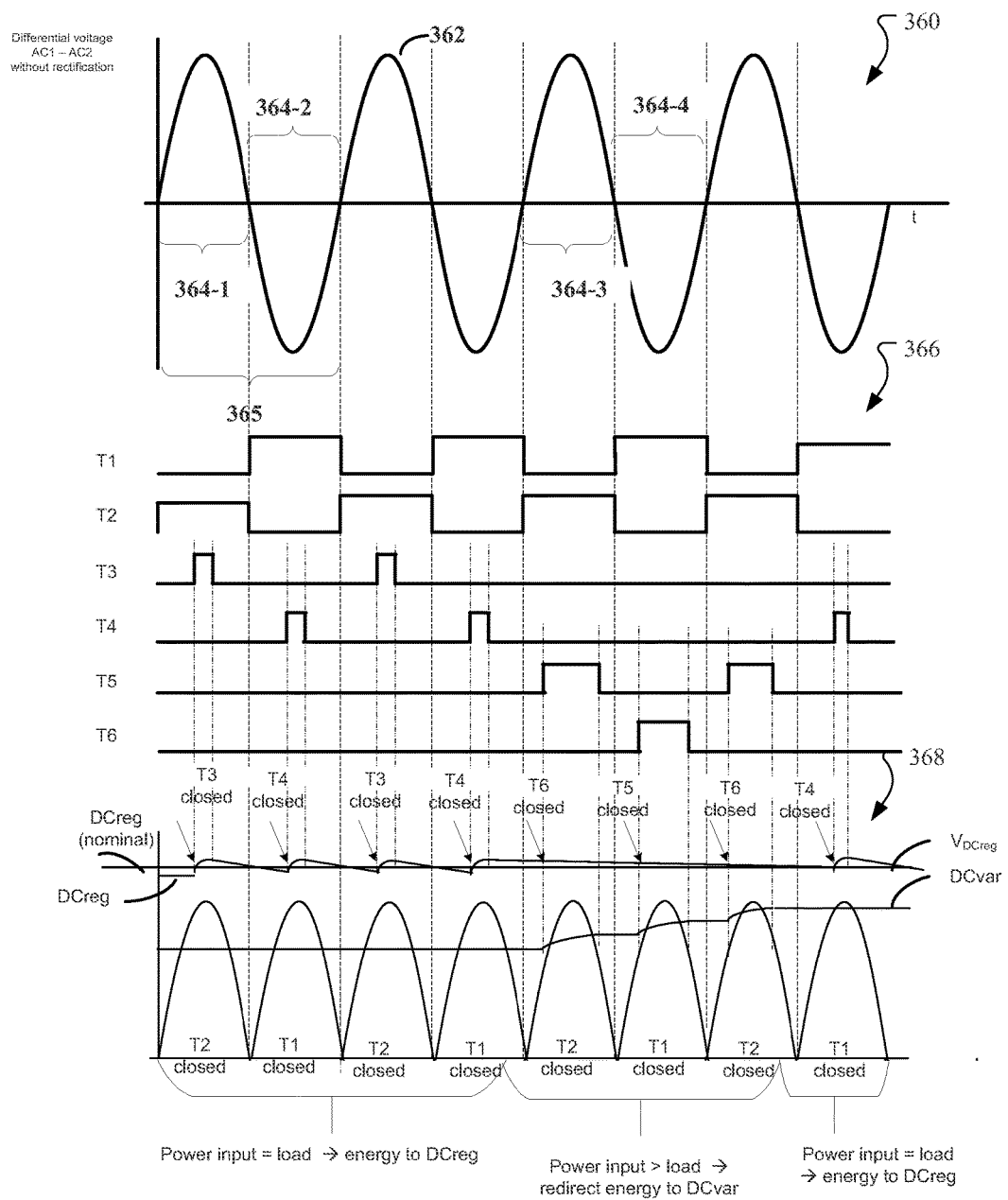
FIG. 3 shows an example of a timing diagram according to various embodiments of the present disclosure.

As previously discussed, and further illustrated by the timing diagram of FIG. 3, the determination relative to the threshold voltage value can be made during a preceding rectifying cycle for a current rectifying cycle. For example, the control logic circuit 210 can determine if a value of the output voltage (e.g., output 234) during a first rectifying cycle is below a threshold value and enable one of the first rectifying circuit to provide a rectified signal to the output load and the second rectifying circuit to provide the rectified signal to the capacitor 202 during a second rectifying cycle. The first rectifying cycle can include an immediately preceding rectifying cycle from the second rectifying cycle. The determination can be, for instance, at a quarter-point of the first rectifying cycle (e.g., not at a peak voltage of the rectifying cycle).

Which path of the respective enabled rectifying circuit is used can be dependent on a phase of the wireless signal at the particular rectifying cycle. For instance, in various embodiments, the voltage control circuit can include a reference adjustment circuit to shift a reference point of the wireless signal received by the antenna 212, as discussed above.

Depending on the value of the output voltage at the preceding rectifying cycle, the control logic circuit 210 can enable one of the first rectifying circuit or the second rectifying circuit. For example, in response to the output voltage being below the threshold voltage value, the control logic circuit 210 can enable the first rectifying circuit. As the transistor 240 is enabled, in such an example, the first rectifying path can be enabled by the control logic circuit 210. Thus, the wireless signal received by the antenna 212 can be transmitted through transistor 242 (e.g., T3) to rectify the signal. The rectified signal can be provided to the output load. By contrast, in response to the output voltage being above the threshold voltage value, the control logic circuit 210 can enable the third rectifying circuit. The wireless signal, in such an instance, received by the antenna 212 can be transmitted on a path through the transistor 248 (e.g., T6) to rectify the signal. The rectified signal can be output 232 and provided to the capacitor 202 for storage.

For example, node AC2 can be connected to ground 250 in response to the wireless signal being positive. Connecting the node AC2 to ground can enable the second transistor 240 of the reference adjustment circuit (e.g., T2). In various embodiments, the node AC1 can be connected to ground 250 in response to the wireless signal being negative. Connecting the node AC1 to ground can be accomplished by enabling the transistor 238 (e.g., T1). Similarly, the control logic circuit 210 can enable one of the first rectifying circuit or the second rectifying circuit. For example, in response to the output voltage being below the threshold voltage value, the control logic circuit 210 can enable the first rectifying circuit. As transistor 238 of the reference adjustment circuit is enabled, the second rectifying path can be enabled by the control logic circuit 210. Thus, the wireless signal received by the antenna 212 can be transmitted on a path through the transistor 244 to rectify the signal. The rectified signal can be provided to the output load. By contrast, in response to the output voltage being above the threshold voltage value, the control logic circuit 210 can enable the second rectifying circuit. Because the transistor 238 is enabled, the fourth rectifying path can be enabled by the control logic circuit 210. The wireless signal, in such an instance, can be transmitted on a path between the transistor 246 (e.g., T5) to rectify the signal. The rectified signal can be output 232 and provided to the capacitor 202 for storage.

In accordance with some embodiments, the control logic circuit 210 can ground one of the nodes associated with the reference adjustment circuit to enable a transistor (e.g., T1 or T2) based on the polarity of the wireless signal at the beginning of a rectifying cycle, and then enable a particular rectifying path to rectify a wireless signal and provide the rectified signal to one of the capacitor 202 or the output load during the rectifying cycle. For example, the control logic circuit 210 can ground AC2 to enable T2 and then enable the first rectifying path (e.g., enable T3) of the first rectifying circuit. The transistor of the particular rectifying circuit can be closed at a quarter-cycle (e.g., one quarter of the half-wave associated with the rectifying cycle) of the rectifying cycle and opened at a third quarter-cycle (e.g., third quarter of the half-wave) of the rectifying cycle.

In various embodiments, the transistors 242, 244, 246, 248 of the first and second rectifying circuits can include a back gate control. The back gate control can prevent uncontrolled current flow through the upper transistors body diodes, such that only the intended path is supplied with the wireless signal. Alternatively and/or in addition, each transistor 242, 244, 246, 248 of the first and the second rectifying circuit can be include two transistors in series with their drains or sources tied together to prevent uncontrolled flow through the upper transistor body diodes. This may increase the series resistance and/or die size as compared to a back gate control.

In some embodiments, the capacitor 202 can be pre-charged to a threshold level. The threshold level can include a same level as the output load (as seen on capacitor 236). For example, to achieve a smooth transition between the impedance of the two capacitors 202, 236, the capacitor 202 is pre-charged to the same level as the capacitor 236 associated with the output load. If the DC levels of the two capacitors 202, 236 are within a threshold level (e.g., close), a change of the path of the rectified signals from the capacitor 202 to the capacitor 236 associated with the output load will result in a reduced impedance-mismatch, as seen by the circuit 230 toward the wireless power transmitter. In some embodiments, operation of the circuit 230 to divert excess power to the capacitor 202 can result in increasing impedance as seen by the wireless power transmitter over time as the voltage at the capacitor 202 may increase. That is, the effective impedance of the capacitor 202 can adjust over time in response to provided rectified signals (e.g., via a change in voltage at the capacitor 202). The increase can be particularly useful for adjusting the relative average impedances over time (and corresponding current draw) for the two rectifying circuits.

Although the embodiment of FIG. 2 illustrates a particular type of transistor, embodiments in accordance with the present disclosure are not so limited and can include a variety of transistors. For example, the transistors can include a bipolar junction transistor, a junction gate field-effect transistor (e.g., n-type or p-type), a metal-oxide-semiconductor field-effect transistor, etc.

FIG. 3 shows an example of a timing diagram according to various embodiments of the present disclosure. As illustrated by the top graph 360, a wireless signal is an AC signal that can be represented as a wave 362. The wave 362 can be a sine-wave. The wave 362 can have two phases, one positive and one negative. Each half-wave (e.g., first half-wave 364-1 and second half-cycle 364-2) of a cycle 365 of the wave 362 is associated with a rectifying cycle as described in various embodiments of the present disclosure.

The middle portion of FIG. 3, illustrates a graph 366 showing timing for control signals of the various transistors of an apparatus, such as the circuit 100 illustrated by FIG. 1 and the circuit 230 illustrated by FIG. 2. The transistors illustrated by FIG. 3 (e.g., T1, T2, T3, T4, T5 and T6) can correspond to the transistors illustrated by FIG. 2 (e.g., T1 238, T2 240, T3 242, T4 244, T5 246 and T6 248). As illustrates by the graph 366, a transistor is enabled when a control signal is brought high (e.g., is closed) and is disabled when the control signal is brought low. Although embodiments are not so limited and the transistors can be enabled using a variety of techniques.

As illustrated by the bottom graph 368, the control logic circuit of an apparatus can synchronously control rectification of a wireless signal and an output voltage provided to an output load. For example, during a first rectifying cycle that is associated with the first half-wave 364-1, the phase of the wireless signal is positive (e.g., AC1-AC2 is positive). During the first half-wave 364-1, the control logic circuit can ground AC2 by enabling enable T2 (e.g., the transistor 240 is active high). Further, the control logic circuit can determine that the output voltage (e.g., the regulated direct current (DC) output "DCreg") is below a threshold (nominal) voltage value (e.g., DCreg nominal) and enable the first rectifying circuit to provide rectifying signals to an output load. In the first rectifying cycle, T3 (e.g., the transistor 242)

can be closed to enable the first rectifying path through T3 and to provide a rectified signal to the output load.

During a second rectifying cycle associated with a second half-wave 364-2 of a cycle 365 of the wave 362, the phase of the wireless signal can be negative (e.g., AC1-AC2 is negative). The control logic circuit can ground AC1, during the second rectifying cycle, by enabling T1 (e.g., the transistor 238). Further, during the first rectifying cycle associated with the first half-wave 364-1, the control logic circuit can determine that the output voltage DCreg is below the threshold voltage value DCreg nominal. During the second rectifying cycle, the control logic circuit can enable the first rectifying circuit to provide the rectified signal to the output load. For example, during the second rectifying cycle, T4 (e.g., the transistor 244) can be closed to enable the second rectifying path through T4 and to provide the rectified signal to the output load.

In various embodiments, the value of the output voltage DCreg can go above the threshold voltage value DCreg nominal. For example, during a third rectifying cycle associated with a third half-wave 364-3 of the wave 362, the value of the output voltage DCreg can be above the threshold voltage value DCreg nominal. The determination can be made, for instance, during the preceding rectifying cycle. As illustrated by FIG. 3, the phase of the wireless signal in the third half-wave 364-3 is positive. The control logic circuit can ground AC2 by enabling T2 (e.g., the transistor 240). Further, as the output voltage is above the threshold voltage value (e.g., DCreg nominal), the control logic circuit can enable the second rectifying circuit to provide a rectified signal to a capacitor. During the third rectifying cycle, T6 (e.g., the transistor 248) can be closed to enable the third rectifying path through T6.

Similarly, during a fourth rectifying cycle associated with a fourth half-wave 364-4 of the wave 362, the value of the output voltage DCreg can be above the threshold voltage value DCreg nominal. As illustrated, the phase of the wireless signal can be negative during the fourth rectifying cycle. The control logic circuit can ground AC1 (e.g., the transistor 238) during the fourth half-wave 364-4 to enable T1 (e.g., the transistor 238). Further, during the third rectifying cycle associated with third half-wave 364-3, the control logic circuit can determine that the output voltage is above the threshold voltage value. The control logic circuit, during the fourth rectifying cycle, can enable the second rectifying circuit to provide the rectified signal to the capacitor. For example, during the fourth rectifying cycle, T5 (e.g., the transistor 246) can be closed to enable the fourth rectifying path through T5.

Figure 4:
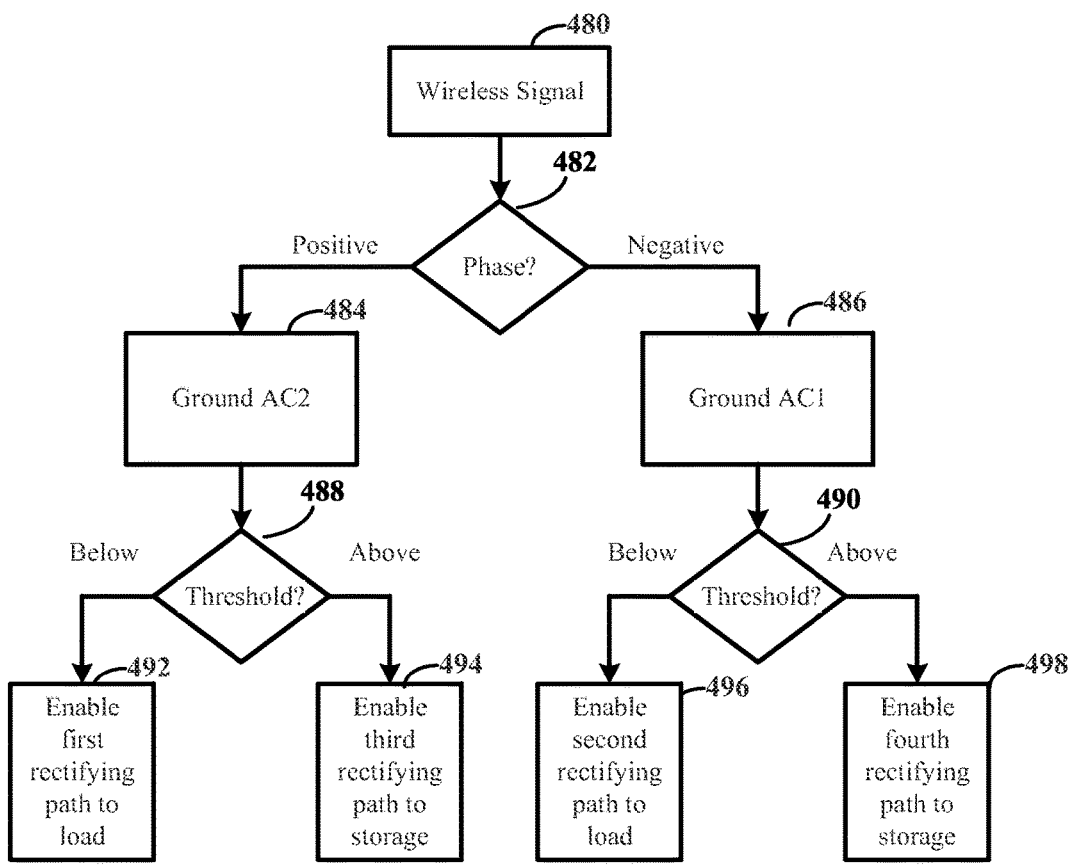
FIG. 4 shows a flow diagram of an example process for controlling an output voltage using rectifying circuitry according to various embodiments of the present disclosure.

FIG. 4 shows a flow diagram of an example process for controlling an output voltage using rectifying circuitry according to various embodiments of the present disclosure. The apparatus illustrated by FIG. 1 and/or FIG. 2, in various embodiments, may be implemented to perform the process or processes illustrated by FIG. 4. For example, the process illustrated by FIG. 4 can be used to synchronously rectify wireless signals with controlling an output voltage provided to an output load.

At block 480, a wireless signal can be received using an antenna of an apparatus. The antenna can receive the wireless signal using inductive or magnetic coupling, for example. At block 482, a phase of the wireless signal can be determined. For example, in response to a positive phase of the wireless signal, at block 484, a node AC2 can be connected to ground to enable a second transistor (T2) of a reference adjustment circuit.

Further, at block 488, the control logic circuit can determine if an output voltage provided to an output load of the apparatus is below a threshold voltage value. The determination can be made based on a value of the output voltage during a preceding rectifying cycle. For example, if it is a second rectifying cycle, a determination can be made during a first rectifying cycle that is earlier in time than the second rectifying cycle. In response to the output voltage being below the threshold value, a first rectifying circuit can be enabled to provide a rectified signal to an output load. In response to the output voltage being above the threshold voltage value, a second rectifying circuit can be enabled to provide the rectified signal to a capacitor. For example, at block 492, in response to the output voltage being below the threshold voltage value, a first rectifying path of the first rectifying circuit can be enabled to rectify the wireless signal and to provide the rectified signal to the output load. In response to the output voltage being above the threshold voltage value, at block 494, a third rectifying path of the second rectifying circuit can be enabled to rectify the wireless signal and to provide the rectified signal to the capacitor.

Alternatively and/or in addition, in response to the negative phase of the wireless signal, at block 486, a node AC1 can be connected to ground to enable a first transistor (T1). Further, at block 490, the control logic circuit can determine if an output voltage provided to an output load of the apparatus is below a threshold voltage value. The determination can be made based on a value of the output voltage during a preceding rectifying cycle. At block 496, in response to the output voltage being below the threshold voltage value, a second rectifying path of the first rectifying circuit can be enabled to rectify the wireless signal and to provide the rectified signal to the output load. In response to the output voltage being above the threshold voltage value, at block 498, a fourth rectifying path of the second rectifying circuit can be enabled to rectify the wireless signal and to provide the rectified signal to the capacitor.

This process can be continued for each wireless signal received and for each change of a phase of the received wireless signal. For example, during a second rectifying cycle, in response to a value of the output voltage at the first rectifying cycle being below the threshold voltage value, the control logic circuit can enable a path of a first rectifying circuit for a second rectifying cycle of the wireless signal, rectify the wireless signal using the first rectifying circuit, provide the rectified signal to an output load, and determine if the output voltage provided to the output load is below the threshold voltage value based on a value of the output voltage during the second rectifying cycle. During a third rectifying cycle, in response to the value of the output voltage during the second rectifying cycle being below the threshold voltage value, the control logic circuit can enable the first rectifying circuit to provide the rectified signal to the output load. Alternatively, during the third rectifying cycle, in response the value of the output voltage during the second rectifying cycle being above the threshold voltage value, the control logic circuit can enable the second rectifying circuit to provide the rectified signal to the capacitor. The control logic circuit, during the third rectifying cycle, can determine if a value of the output voltage provided to the output load is below the threshold voltage value (e.g., for use during a fourth rectifying cycle).

Various blocks, modules or other circuits may be implemented to carry out one or more of the operations and activities described herein and/or shown in the figures. In these contexts, a "block" (also sometimes "circuit", "logic circuitry", or "module") is a circuit that carries out one or more of these or related operations/activities (e.g., determine if an output voltage is below a threshold voltage value, enable a first rectifying circuit, or enable a second rectifying circuit). In various embodiments, a hard-wired control block can be used to minimize the area for such an implementation in case a limited flexibility is sufficient. Alternatively and/or in addition, in certain of the above-discussed embodiments, one or more modules are discreet logic circuits or programmable logic circuits configured and arranged for implementing these operations/activities, as in the circuit modules shown in FIG. 1 (e.g., control logic circuit). In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Based upon the above discussion and illustrations, those skilled in the art will readily recognize that various modifications and changes may be made to the various embodiments without strictly following the exemplary embodiments and applications illustrated and described herein. For example, an apparatus can include additional circuits than illustrated by FIGS. 1 and 2. Such modifications do not depart from the true spirit and scope of various aspects of the invention, including aspects set forth in the claims.

What is claimed is:

1. An apparatus comprising:
   an antenna;
   a capacitor; and
   voltage control circuitry including:
      a first rectifying circuit configured and arranged to rectify a wireless signal received by the antenna and to provide a rectified first signal to an output load;
      a second rectifying circuit configured and arranged to rectify the wireless signal received by the antenna and to provide a rectified second signal to the capacitor; and
      a control logic circuit configured and arranged to regulate an output voltage at the output load relative to a threshold voltage value, and, for each rectifying cycle,
         determine whether the output voltage is above the threshold voltage value or below the threshold voltage value;
         enable, in response to determining that the output voltage is below the threshold voltage value, the first rectifying circuit to provide the rectified first signal to the output load; and
         enable, in response to determining that the output voltage is above the threshold voltage value, the second rectifying circuit to provide the rectified second signal to the capacitor.

2. The apparatus of claim 1, wherein the control logic circuit is configured and arranged to determine that the output voltage is below the threshold voltage value for a current rectifying cycle based on a value of the output voltage during a preceding rectifying cycle, the current rectifying cycle being later in time than the preceding rectifying cycle.

3. The apparatus of claim 1, wherein the voltage control circuitry is configured and arranged to synchronously regulate the output voltage with providing the rectified first and second signals.

4. The apparatus of claim 1, wherein the voltage control circuitry further includes a reference adjustment circuit configured and arranged to shift a reference point of the rectified first and second signals.

5. The apparatus of claim 4, wherein the control logic is configured and arranged to enable a first transistor of the reference adjustment circuit based on detecting a first phase of the rectified first signal, and to enable a second transistor of the reference adjustment circuit based on detecting a second phase of the rectified first signal.

6. The apparatus of claim 1, further including another capacitor configured and arranged to accumulate voltage output from the first rectifying circuit and to output the accumulated voltage to the output load.

7. The apparatus of claim 1, wherein the capacitor is configured and arranged to adjust an impedance of the capacitor over time in response to one or more rectified signals provided to the capacitor.

8. An apparatus comprising:
   an antenna;
   a capacitor; and
   voltage regulator circuitry including:
      a first rectifying circuit configured and arranged to rectify a wireless signal received by the antenna and to provide a rectified first signal to an output load;
      a second rectifying circuit configured and arranged to rectify the wireless signal received by the antenna and to provide a rectified second signal to the capacitor; and
      a control logic circuit configured and arranged to regulate an output voltage at the output load relative to a threshold voltage value, and, for each rectifying cycle associated with a half-wave of the wireless signal, compare the output voltage to the threshold voltage value;
         in response to the output voltage being below the threshold voltage value, enable one of a first path and a second path of the first rectifying circuit to provide the rectified first signal to the output load; and
         in response the output voltage being above the threshold voltage value, enable one of a third path and a fourth path of the second rectifying circuit to provide the rectified second signal to the capacitor.

9. The apparatus of claim 8, wherein the control logic circuit is configured and arranged to determine the output voltage based on a value of the output voltage during a preceding rectifying cycle, the preceding rectifying cycle being earlier in time than a current rectifying cycle.

10. The apparatus of claim 8, wherein the apparatus is configured and arranged to pre-charge the capacitor to a same voltage level as another capacitor associated with the output load.

11. The apparatus of claim 8, further including another capacitor configured and arranged to low-pass filter the output voltage.

12. The apparatus of claim 8, wherein the capacitor is configured and arranged to adjust an effective impedance of the capacitor in response to the receiving the provided rectified second signal.

13. The apparatus of claim 8, wherein the voltage regulator circuit further includes:

a reference adjustment circuit configured and arranged to shift a reference point of the rectified first and second signals, wherein the control logic circuit is configured and arranged to selectively shift a reference point for the wireless signal based on a polarity of the wireless signal.

14. The apparatus of claim 8, wherein the control logic circuit is configured and arranged to change an enabled path for each rectifying cycle synchronously with a beginning of a particular rectifying cycle of the wireless signal.

15. An apparatus comprising:
an antenna configured and arranged to receive a wireless signal;
a capacitor configured and arranged to accumulate voltage; and
voltage control circuitry including:
   a first rectifying circuit configured and arranged to rectify the wireless signal received by the antenna and to provide a rectified first signal to an output load, the first rectifying circuit including:
      a first rectifying path through a first transistor, and configured and arranged to provide the rectified first signal to an output load; and
      a second rectifying path through a second transistor, and configured and arranged to provide the rectified first signal to the output load;
   a second rectifying circuit configured and arranged to rectify the wireless signal and to provide the rectified second signal to the capacitor, the second rectifying circuit including:
      a third rectifying path through a third transistor, and configured and arranged to provide the rectified second signal to the capacitor; and
      a fourth rectifying path through a fourth transistor, and configured and arranged to provide the rectified second signal to the capacitor; and
   a control logic circuit configured and arranged to regulate an output voltage at the output load relative to a threshold voltage value, and for each rectifying cycle associated with a half-wave of the wireless signal,
      determine if the output voltage is below the threshold voltage value;
      enable, in response to the output voltage being below the threshold voltage value, one of the first and second rectifying paths to provide the rectified first signal to the output load; and
      enable, in response to the output voltage being above the threshold voltage value, one of the third and fourth rectifying paths to provide the rectified second signal to the capacitor.

16. The apparatus of claim 15, wherein the control logic circuit is configured and arranged to determine if a value of the output voltage during a first rectifying cycle is below the threshold voltage value, and
enable, in response to the value of the output voltage during the first rectifying cycle being below the threshold voltage value, one of the first and second rectifying paths to provide the rectified first signal to the output load for a second rectifying cycle.

17. The apparatus of claim 15, wherein the control logic circuit is configured and arranged to determine if a value of the output voltage during a first rectifying cycle is below the threshold voltage value, and
enable, in response to the value of the output voltage during the first rectifying cycle being above the threshold voltage value, one of the second and third rectifying paths to provide the rectified second signal to the capacitor for a second rectifying cycle.

18. The apparatus of claim 15, wherein the control logic circuit is configured and arranged to select one of the first rectifying circuit and the second rectifying circuit for a second rectifying cycle during first rectifying cycle, the first rectifying cycle including a preceding cycle from the second rectifying cycle.

19. The apparatus of claim 15, wherein the first, second, third, and fourth transistors are further configured and arranged with a back gate control, each of the back gate controls being configured and arranged to prevent uncontrolled current from flowing through the first, second, third, and fourth transistors.

20. The apparatus of claim 15, wherein the first, second, third, and fourth transistors are further configured and arranged with two additional transistors, each of the two additional transistors being configured and arranged to prevent uncontrolled current from flowing through the respective first, second, third, and fourth transistor.

* * * * *